United States Patent [19]

Shamshoum et al.

[11] Patent Number: 5,891,817
[45] Date of Patent: Apr. 6, 1999

[54] ELECTRON DONORS FOR IMPROVED OLEFIN POLYMERIZATION

[75] Inventors: Edwar S. Shamshoum, Houston; David John Rauscher, Webster, both of Tex.

[73] Assignee: Fina Technology, Inc., Dallas, Tex.

[21] Appl. No.: 474,954

[22] Filed: Jun. 7, 1995

Related U.S. Application Data

[63] Continuation-in-part of Ser. No. 174,726, Dec. 29, 1993, which is a continuation-in-part of Ser. No. 895,287, Jun. 8, 1992, abandoned.

[51] Int. Cl.⁶ .............. B01J 31/00; B01J 37/00; C08F 4/02; C08F 4/60
[52] U.S. Cl. .......... 502/127; 502/103; 502/115; 502/116; 502/133; 502/158; 502/126; 502/125; 526/128; 526/124.9; 526/125.3
[58] Field of Search .................... 502/116, 120, 502/125, 127, 158

[56] References Cited

U.S. PATENT DOCUMENTS

| | | | |
|---|---|---|---|
| 4,335,016 | 6/1982 | Dombro | 502/125 |
| 4,420,594 | 12/1983 | Ueno et al. | 502/158 |
| 4,547,552 | 10/1985 | Toyota et al. | 525/247 |
| 4,562,173 | 12/1985 | Terano et al. | 502/125 |
| 4,816,433 | 3/1989 | Terano et al. | 502/125 |
| 4,839,321 | 6/1989 | Murai et al. | 502/127 |
| 4,927,797 | 5/1990 | Ewen | 502/125 |
| 4,952,649 | 8/1990 | Koika et al. | 502/125 |
| 5,028,671 | 7/1991 | Kioka et al. | 502/116 |
| 5,177,043 | 1/1993 | Koyama et al. | 502/125 |
| 5,192,732 | 3/1993 | Duranel et al. | 502/125 |
| 5,296,433 | 3/1994 | Siedel et al. | 502/103 |
| 5,308,818 | 5/1994 | Shamshoum et al. | 502/125 |
| 5,336,652 | 8/1994 | Mink et al. | 502/125 |
| 5,498,770 | 3/1996 | Hosaka et al. | 502/125 |
| 5,547,912 | 8/1996 | Kataoka et al. | 502/116 |
| 5,652,303 | 7/1997 | Ishimaru et al. | 502/127 |

FOREIGN PATENT DOCUMENTS

| | | | |
|---|---|---|---|
| 0 385 765 | 9/1990 | European Pat. Off. | |
| 49-119979 | 11/1974 | Japan | 502/158 |
| 53-2584 | 1/1978 | Japan | 502/125 |
| 62-252404 | 11/1987 | Japan | 502/158 |
| 1-139601 | 6/1989 | Japan | 502/158 |

OTHER PUBLICATIONS

R. Morrison and R. Boyd, "Organic Chemistry", 3ed., pp. 80, 82–85, 1973.

J. Schofer, Memorandum to AU 1505 regarding Indefiniteness of Ranges within a Range, Feb. 1993.

*Primary Examiner*—Mark L. Bell
*Assistant Examiner*—J. Pasterczyk
*Attorney, Agent, or Firm*—Jimmy D. Wheelington; M. Norwood Cheairs

[57] ABSTRACT

The present invention provides a catalyst system that exhibits unprecedented catalyst efficiencies and control of desired properties in the polymer product. The catalyst system includes a new generation titanium catalyst in combination with an electron donor described by the formula:

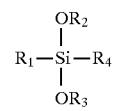

wherein $R_1$ is an alkyl group containing a primary carbon atom attached to the silicon atom; $R_2$ and $R_3$ are alkyl or aryl groups; and $R_4$ is an alkyl group with a primary carbon atom attached to the silicon atom; $R_1$ and $R_4$ are the same or different. $R_1$ and $R_4$ are preferably chosen from the group consisting of n-propyl, n-butyl and methyl; most preferably n-propyl and n-butyl with $R_1$ and $R_4$ being the same or, alternatively, most preferably, $R_1$ is methyl and $R_4$ is $C_3$ or higher. The system has a catalyst efficiency of over 30 kg/g-cat·h as the Si/Ti mole ratio varies from 4–20 in the system. The system easily achieves efficiencies over 30 kg/g-cat·h. The system also exhibits good control over the xylene solubles of the polymer products.

11 Claims, No Drawings

ELECTRON DONORS FOR IMPROVED OLEFIN POLYMERIZATION

This is a continuation-in-part of application Ser. No. 08/174,726 filed Dec. 29, 1993, which is a continuation-in-part of prior U.S. application Ser. No. 07/895,287 filed Jun. 8, 1992, now abandoned.

BACKGROUND

1. Technical Field

The present invention provides a catalyst system for the polymerization of olefins that include the combination of a titanium catalyst with an electron donor compound of the formula:

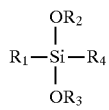

wherein $R_1$ is an alkyl group of the formula $-CH_2R'$ in which $R'$ is hydrogen or an n-alkyl group; $R_2$ and $R_3$ are alkyl or aryl groups; and $R_4$ is an alkyl group of the formula $-CH_2R'$ in which $R'$ is hydrogen or an n-alkyl group, $R_1$ and $R_4$ are the same or different.

2. Description of Prior Art

Catalyst systems for the polymerization of olefins are well known in the art. Typically, these systems include a Ziegler-Natta type polymerization catalyst; a co-catalyst, usually an organoaluminum compound; and an electron donor, usually an organosilicon compound. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

A Ziegler-Natta type polymerization catalyst is basically a complex derived from a halide of a transition metal, for example, titanium, chromium or vanadium with a metal hydride and/or a metal alkyl that is typically an organoaluminum compound. The catalyst is usually comprised of a titanium halide supported on a magnesium compound complexed with an alkylaluminum.

The development of polymerization catalysts has improved catalyst properties, particularly, the efficiencies of the catalysts, as expressed in kilograms of polymer product per gram of catalyst in two hours, have increased from the 1–3 range to the 10–12 range and beyond. Catalysts have been developed that not only have higher efficiencies but also retain their activity over a longer period of time, thus being able to produce more polymer product over the life of the catalyst. Any increase in the efficiency and life of the catalyst leads to lower costs due to lower catalyst consumption, and it also lowers the capital expenditures in building and operating a plant as the size of the reactors are lowered for specific plant capacities and the reactor residence time is lowered. A higher efficiency also leads to a cleaner polymer product thereby avoiding the need to wash or treat the product to remove catalyst ash residuals.

In addition to the improved catalysts, improved activation methods have also lead to increases in the catalyst efficiency. A process for pre-polymerizing the catalyst just prior to introducing the catalyst into the reaction zone is disclosed in U.S. Pat. No. 4,767,735 the disclosure of which is hereby incorporated by reference.

In addition to the development of new catalysts and new reaction processes, a discovery of a more appropriate co-catalyst or electron donor to go with the new generation of catalysts in forming a total catalyst system would be of great benefit to the polymerization art, especially if it leads to dramatic increases in the efficiency of the catalyst system and to improved quality control of the polymer product. In such a total catalyst system, a co-catalyst activates the catalyst and provides the initiation of a polymer chain. A co-catalyst that works well with supported Ziegler-Natta catalysts for the polymerization of olefins is an organoaluminum compound, most typically triethylaluminum (TEAl) or another trialkylaluminum, such as triisobutylaluminum. Examples of other useful organoaluminum compounds include an alkylaluminum dihalide and a dialkylaluminum halide.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound or group of compounds with which it is especially compatible. Work disclosed in *Makromol. Chem.*, Härkönen et al, vol. 192, p. 2857 (1991) and in "Catalytic Olefin Polymerization"(Keii, T., Soga, K., Eds., Elsevier:New York, 1990) Härkönen et al, p. 87, has shown that some effects of the donor can be influenced by its structure and suggests that a high performance alkoxysilane donor will contain at least two small alkoxy groups, preferably methoxy and one or two branched alkyl groups. Other work suggested that a good donor preferably has a dimethoxy structure with a bulky alkyl or cycloalkyl group containing at least one secondary or tertiary carbon, but that the second alkyl group should contain a primary carbon. One such group of electron donors are disclosed in U.S. Pat. No. 4,927,797.

The present invention comprises another such discovery of an appropriate type of electron donor which gives significant increases in catalyst efficiency as well as improved control of the isotactic index of the desired polymer product and other properties of the product would be highly advantageous. It has been surprisingly discovered that a specific group of silane compounds serving as electron donors in combination with a particular type of catalyst results in significant increases in catalyst efficiency over the previously known efficiencies for this particular type of catalyst as well as other known catalyst systems.

SUMMARY OF THE INVENTION

The present invention provides a system for the polymerization of olefins wherein the system includes the combination of a particular type of catalyst with a specific group of electron donor compounds which results in significant increases in the efficiency of the catalyst and improved control of the properties of the polymer product. The catalyst is a supported Ziegler-Natta catalyst comprising a complex of a dialkoxy magnesium and a titanium halide. The electron donor is selected from a organosilicon compound of the following formula:

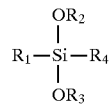

wherein $R_1$ is an alkyl group of the formula $-CH_2R'$ in which $R'$ is hydrogen or an n-alkyl group; $R_2$ and $R_3$ are alkyl or aryl groups; and $R_4$ is an alkyl group of the formula —$CH_2R'$ in which R' is hydrogen or an n-alkyl group, $R_1$ and $R_4$ being the same or different. In a preferred embodiment, $R_1$ is an alkyl group of up to 5 carbon atoms; $R_2$ and $R_3$ are methyl, ethyl, propyl, or butyl groups and not necessarily the same; and $R_4$ is an alkyl group of up to 5 carbon atoms; $R_1$ and $R_4$ are preferably selected from the groups consisting of n-propyl, n-butyl and methyl, most preferably, n-propyl and n-butyl with $R_1$ and $R_4$ being the same and, alternatively, most preferably, $R_1$ is methyl and $R_4$ is $C_3$ or higher; preferred electron donors are di-n-propyidimethoxysilane (DPDS), di-n-butyidimethoxysilane (DBDS), and n-butylmethyldimethoxysilane (BMDS). In addition, the system may contain an organoaluminum compound which acts as a co-catalyst. A preferred co-catalyst is a trialkylaluminum, most preferably triethylaluminum (TEAl).

The invention also provides a catalyst system as described above, wherein the system is capable of polymerizing an olefin monomer with a catalyst efficiency of about 30 kilograms of polymer product per gram of catalyst in one hour. Particular catalyst systems included in the invention may show somewhat lower efficiencies. Further, the catalyst system may be characterized by an efficiency of over 30 kg/g-cat·h while the Si/Ti ratio defined by the mole ratio of the silane electron donor to the titanium component of the catalyst varies within the range 4–200.

The invention also provides a process for the polymerization of olefins. The process comprises:
  (a) forming a catalyst by:
    (i) selecting a conventional supported Ziegler-Natta catalyst component;
    (ii) contacting the catalyst component with an organoaluminum compound;
    (iii) contacting the catalyst component with an electron donor either simultaneously with or after step (ii), said electron donor being described by the formula:

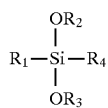

wherein $R_1$ is an alkyl group of the formula —$CH_2R'$ in which R' is hydrogen or an n-alkyl group; $R_2$ and $R_3$ are each independently an alkyl or aryl group; and $R_4$ is an alkyl group of the formula —$CH_2R'$ in which R' is hydrogen or an n-alkyl group, $R_1$ and $R_4$ are the same or different,
  a primary carbon atom attached to the silicon atom; $R_1$ and $R_4$ are the same or different
  (b) introducing said catalyst into a reaction zone under polymerization conditions containing said monomer; and
  (c) withdrawing a polymer product from the reaction zone. Preferably, the catalyst component comprises a solid catalyst component prepared by:
  (a) suspending a dialkoxy magnesium in an aromatic hydrocarbon that is liquid of normal temperatures,
  (b) contacting the dialkoxy magnesium with a titanium halide and further contacting the resulting composition a second time with the titanium halide, and
  (c) contacting the dialkoxy magnesium with a diester of an aromatic dicarboxylic acid at some point during the treatment with the titanium halide in (b); The process further comprises withdrawing a polymer product in which the xylene solubles are at less than 3.00 wt %, while the Si/Ti ratio in the reaction zone is within the range 4–200.

DETAILED DESCRIPTION OF THE INVENTION

The present invention relates to the combination of a particular group of compounds as electron donors with a particular type of catalyst for use in the polymerization of propylene. This combination results in a catalyst system that has a catalyst efficiency significantly higher than provided by previous catalyst systems as illustrated by the comparative examples included below. Further, the catalyst system of the present invention retains most of its high activity over time relative to other catalyst systems. The catalyst system also provides better control of the xylene solubles of the polymer product than with other electron donors and the particular type of catalyst. These and other beneficial advantages will become more apparent from the following detailed description of the invention and the accompanying examples.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Compounds suitable as internal electron-donors for preparing conventional supported Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. These esters of phthalic acid are the preferred donors.

The second use for an electron donor in a catalyst system is as an external electron donor or selectivity control agent (SCA) in the polymerization reaction. The same compound may be used in both instances, although typically they are different. A common external electron donor is an organic silicon compound, for example, cyclohexylmethyldimethoxysilane (CMDS). A description of the two types of electron donors is provided in U.S. Pat. No. 4,535,068, the disclosure of which is hereby incorporated by reference.

As the present invention relates particularly to external electron donors, the term "electron donor" as used herein, refers to the external donor or SCA. The external electron donor acts as a stereoregulator to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; 4,473,660 and 4,927,797. As mentioned, a particular catalyst may produce better results when paired with a particular group of electron donors. Examples of this pairing of catalyst and electron donors are disclosed in U.S. Pat. Nos. 4,562,173; 4,547,552; and 4,927,797.

It has been discovered that a particular group of electron donors does significantly enhance the catalytic properties of conventional Ziegler-Natta Catalyst. Any of the conventional Ziegler-Natta transition metal compound catalyst components can be used in the present invention. The compound is preferably of the general formula $MR^+_x$ where M is the metal, R is a halogen or a hydrocarboxyl and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)_3Cl$, $Ti(OC_3H_7)_2Cl_2$, TiOC$_6$H$_{13}$)$_2$Cl$_2$, Ti(OC$_2$H$_5$)$_2$Br$_2$ and Ti(OC$_{12}$H$_{25}$)Cl$_3$. Mixtures of the transition metal compounds may be used. No restriction on the number of transition metal compounds is made as long as at least one transition metal compound is present.

If supported, the support should be an inert solid which is chemically unreactive with any of the components of the conventional Ziegler-Natta catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

One particular Ziegler-Natta catalyst which can be used in the present invention comprises a commercially available supported catalyst component for the polymerization of olefins comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii), as disclosed in U.S. Pat. Nos. 4,927,797; 4,816,433 and 4,839,321, the disclosures of which are hereby incorporated.

Preferred aromatic hydrocarbons useful in the formation of the catalyst include benzene, xylene, ethylbenzene, propylbenzene and trimethylbenzene. A diester of phthalic acids is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate. Suitable titanium halides include TiCl$_4$, TiBr$_4$ and TiI$_4$, with TiCl$_4$ being preferred.

The ratios of the respective components are not critical but can vary to tailor the performance of the catalyst. However, in generally, the diester of the aromatic dicarboxylic acid is used in an amount of 0.01 to 2 g, preferably 0.1 to 1 g, per gram of the dialkoxy magnesium, and the titanium halide is used in an amount of at least 0.1 g, preferably at least 1 gram, per gram of the alkoxy magnesium. The amount of the aromatic hydrocarbon which is liquid at normal temperature should be sufficient to form a suspension.

Suspension of the dialkoxy magnesium into the aromatic hydrocarbon is performed at a temperature of from room temperature to the boiling point of the aromatic hydrocarbon used for up to 100 hours, preferably up to 10 hours. It is important that the formed suspension should not be a homogeneous solution. The contact of the suspension with the titanium halide and the contact of the composition obtained by said contact with the titanium halide are carried out at a temperature of from −20° C. to the boiling point of the titanium halide used, preferably 50 to 120° C., for 10 minutes to 10 hours. The means for contacting the components is not particularly critical, so far as sufficient contact is attained among the respective components. Preferably, the contact is carried out by using a vessel provided with a stirrer.

The above-described catalyst exhibits some increase in efficiency over previously known catalysts when it is paired with a previously used electron donor, but that increase is significantly greater when the catalyst is paired with electron donors as described by the present invention. This improved efficiency is accompanied by better operational control of the properties of the polymer product such as the xylene solubles.

The electron donors included in the present invention are organic silicon compounds such as those described by the following formula:

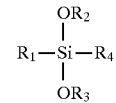

wherein R$_1$ is an alkyl group of the formula —CH$_2$R' in which R' is hydrogen or an n-alkyl group; R$_2$ and R$_3$ are alkyl or aryl groups; and R$_4$ is an alkyl group of the formula —CH$_2$R' in which R' is hydrogen or an n-alkyl group, R$_1$ and R$_4$ are the same or different.

In preferred embodiments of the invention, R$_1$ is an alkyl group of up to 5 carbon atoms, R$_2$ and R$_3$ are methyl, ethyl or propyl groups, and R$_4$ is an alkyl group of up to 5 carbon atoms. R$_2$ and R$_4$ are preferably chosen from the group consisting of n-propyl, n-butyl and methyl; most preferably, are n-propyl and n-butyl with R$_1$ and R$_4$ being the same or, alternatively, most preferably, R$_1$ is methyl and R$_4$ is C$_3$ or higher. Most preferred electron donors are di-n-propyldimethoxysilane (DPDS), di-n-butyldimethoxysilane (DBDS) and n-butylmethyldimethoxysilane (BMDS). The combination of this class of electron donors and a conventional supported Ziegler-Natta catalyst yields wholly unexpected results that surpass previously known catalyst systems. The electron donors as described by the present invention may be limited by the stability of the compound and the ease of handling including storage, transportation and use in the plant.

The most significant unexpected result obtained from the combination of the above-described catalyst and electron donor is the dramatic increase in the efficiency of the catalyst system as measured in kilograms of polymer product per gram of catalyst in one hour (kg/g-cat·h). The catalyst system, which includes an organo-aluminum compound, has been shown to achieve efficiencies higher than 30 kg/g-cat·h for Si/Ti mole ratios within the range 4–200. The optimum Si/Ti ratio in order to achieve the highest efficiency is within the range 10–20.

An advantage is that a highly active and stable system produces a cleaner polymer as there is more polymer produced for the same amount of catalyst ash and therefore resulting in a lower percentage of ash content in the polymer. The co-polymer product would be less corrosive, exhibit less color and be more applicable for use in electrical systems.

The present invention also provides a process for the polymerization of olefins using the catalyst and the electron donors described by the above formula comprising:

a) selecting a conventional Ziegler-Natta catalyst component;

b) contacting the catalyst with an organoaluminum compound;

c) contacting the catalyst with an electron donor as described above;

d) introducing the catalyst into a polymerization reaction zone containing the organoaluminum compound, the electron donor and the monomer; and e) extracting polymer product from the reactor.

Although the catalyst system may be used in almost any commercially known polymerization process, the preferred process of the present invention includes a prepolymerization of the catalyst by contacting a small amount of monomer with the catalyst after the catalyst has been contacted with the electron donor. Additionally, the prepolymerized catalyst may be introduced into the reaction zone which contains additional amounts of the organoaluminum co-catalyst and the organosilicon electron donor along with the monomer.

One pre-polymerization process is described in U.S. Pat. Nos. 4,767,735, and 4,927,797, incorporated by reference above. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor.

The following Examples and Comparative Examples illustrate the present invention and its various advantages in more detail. The results are summarized in Tables 1–3. The catalyst component used in Examples 1–23 was prepared with the materials and processes as disclosed in U.S. Pat. Nos. 4,927,797; 4,816,433 and 4,839,321.

EXAMPLE 1

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.0 L of propylene were added. The reactor was stirred at 1000 rpm and the temperature was raised to 70° C. 1.0 mmole of TEAI and 0.02 mmole of DPDS were added to a 40 cc tubular reaction vessel. Ten milligrams of catalyst in a mineral oil suspension were added to the 40 cc reaction cylinder, The TEAI and DPDS were allowed to pre-contact approximately five minutes, and the catalyst was allowed to pre-contact the TEAI and DPDS mixture for approximately two minutes. The tubular reaction vessel was then attached to an entry point on the reactor and filled with room temperature liquid propylene which was allowed to polymerize for about five seconds to effect prepolymerization of the catalyst. The contents of the vessel were then flushed into the reactor with 0.2 L of room temperature propylene. The total amount of liquid propylene present in the reactor was about 1.2 L. The polymerization reaction was allowed to proceed for one hour, at which point it was terminated by venting the excess propylene and cooling the reactor to room temperature. The reactor was then opened to collect the polymer product which was dried and analyzed. The efficiency of the catalyst was determined from the mass yield of polymer for the known amount of catalyst used and reported in kilograms of polymer product per gram of catalyst per hour. The Si/Ti mole ratio was calculated from the molar amount of DPDS used divided by the molar amount of catalyst. The xylene solubles were measured by dissolving the polymer in hot xylene, cooling the solution to 0° C. and precipitating out the isotactic form. The xylene solubles were the wt % of the polymer that was soluble in the cold xylene. In addition, the bulk density of the polymer product was measured and calculated using standard techniques. Bulk density was given in grams per cubic centimeter for the polymer fluff. The results are shown in Table 1.

EXAMPLES 2–7

The procedures of Example 1 were repeated except that the total amount of DPDS was varied as indicated in Table 1 from 0.02 mmoles to 1.00 mmoles. This varied the Si/Ti ratio from 200 to 4 and illustrates the effect of the Si/Ti ratio on the efficiency and on the xylene solubles. The results are tabulated in Table 1.

Comparative Examples 1–5

The procedure of Example 1 were repeated except that CMDS was substituted for DPDS as the electron donor. The results are shown in Table 1.

EXAMPLE 8

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.0 L of propylene were added. The reactor was stirred at 1000 rpm and the temperature remained at room temperature. 1.0 mmole of TEAI and 0.1 mmole of DBDS were added to a 40 cc tubular reaction vessel. Ten milligrams of catalyst in a mineral oil suspension were added to the 40 cc reaction cylinder. The TEAI and DBDS were allowed to pre-contact approximately five minutes, and the catalyst was allowed to pre-contact the TEAI and DBDS mixture for approximately two minutes. The tubular reaction vessel was then attached to an entry point on the reactor and the catalyst was flushed into the reactor with room temperature liquid propylene. The reactor temperature was ramped up to 70° C. The total amount of liquid propylene present in the reactor was about 1.2 L. The polymerization reaction was allowed to proceed for one hour, at which point it was terminated by venting the excess propylene and cooling the reactor to room temperature. The reactor was then opened to collect the polymer product which was dried and analyzed. The efficiency of the catalyst was determined from the mass yield of polymer for the known amount of catalyst used and reported in kilograms of polymer product per gram of catalyst per hour. The Si/Ti mole ratio was calculated from the molar amount of DBDS used divided by the molar amount of catalyst. The xylene solubles were measured by dissolving the polymer in hot xylene, cooling the solution to 0° C. and precipitating out the isotactic form. The xylene solubles were the wt % of the polymer that was soluble in the cold xylene. In addition, the bulk density of the polymer product was measured and calculated using standard techniques. The results are shown in Table 2.

EXAMPLES 9–14

The procedures of Example 8 were repeated except that the total amount of DPDS was varied as indicated in Table 2 from 0.10 mmoles to 1.00 mmoles. This varied the Si/Ti ratio from 10 to 200 and illustrates the effect of the Si/Ti ratio on the efficiency and on the xylene solubles. The amount of hydrogen was decreased to 8 mmoles and increased to 32 mmoles. The results are tabulated in Table 2.

EXAMPLES 15–21

The procedure of Example 8 were repeated except that BMDS was substituted for DPDS as the electron donor. The results are shown in Table 2.

Comparative Examples 6–12

The procedure of Example 8 were repeated except that CMDS was substituted for DPDS as the electron donor. The results are shown in Table 2.

| Polymerization Conditions | Level |
|---|---|
| catalyst | 10 mgrams |
| TEAL | 1.0 mmoles |
| donor | 0.02, 0.05, 0.1, 0.2, 0.5 and 1.0 mmoles |
| Al/Ti | ~200 |
| Al/Si | 50, 20, 10, 5, 2 and 1 |
| Si/Ti | 4, 10, 20, 40, 100 and 200 |
| temperature | 70° C. |
| time | 1 hour |

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.0 L of propylene were added. The reactor was stirred at 1000 rpm and the temperature was raised to 70° C. 1.0 mmole of TEAI and 0.02 mmole of DPDS were added to a 40 cc tubular reaction vessel. Ten milligrams of catalyst in a mineral oil suspension were added to the 40 cc reaction cylinder. The TEAI and DPDS were allowed to pre-contact approximately five minutes, and the catalyst was allowed to pre-contact the TEAI and DPDS mixture for approximately two minutes. The tubular reaction vessel was then attached to an entry point on the reactor and the catalyst was flushed into the reactor with room temperature liquid propylene. The reactor temperature was ramped up to 70° C. The total amount of liquid propylene present in the reactor was about 1.2 L. The polymerization reaction was allowed to proceed for one hour, at which point it was terminated by venting the excess propylene and cooling the reactor to room temperature. The reactor was then opened to collect the polymer product which was dried and analyzed. The efficiency of the catalyst was determined from the mass yield of polymer for the known amount of catalyst used. The efficiency was reported in kilograms of polymer product per gram of catalyst per hour. The Si/Ti mole ratio was calculated from the molar amount of DPDS used divided by the molar amount of catalyst. The xylene solubles were measured by dissolving the polymer in hot xylene, cooling the solution to 0° C. and precipitating out the isotactic form. The xylene solubles were the wt % of the polymer that was soluble in the cold xylene. The results are shown in Table 3.

EXAMPLE 23

The procedures of Example 22 were repeated except that 0.1 mmoles of DPDS was used. The results are shown in Table 3.

Comparative Example 13

The procedures of Example 22 were repeated except the catalyst used was a commercially Ziegler-Natta catalyst component available from a different supplier as that used in Examples 1–21 and believed to be essentially described in U.S. Pat. Nos. 4,476,289 and 4,636,486. The results are shown in Table 3.

Comparative Example 14

The procedures of Example 13 were repeated except that 0.1 mmoles of DPDS was used. The results are shown in Table 3.

| Polymerization Conditions | Level |
|---|---|
| catalyst | 10 mgrams |
| TEAL | 1.0 mmoles |
| donor | 0.02 and 0.1 mmoles |
| Al/Ti | ~200 |
| Al/Si | 50 and 10, respectively |
| Si/Ti | 4 and 20, respectively |
| temperature | 70° C. |
| time | 1 hour |

TABLE 1

| Example | TEAI mmol | DPDS mmol | Si/Ti | Catalyst mg | $H_2$ mmol | Yield p | Efficiency Kg/g-cat·h | Bulk Density | Xylene Solubles wt % |
|---|---|---|---|---|---|---|---|---|---|
| 1 | 1 | 0.02 | 4 | 10 | 16 | 398 | 39.8 | 0.47 | 2.80 |
| 2 | 1 | 0.05 | 10 | 10 | 16 | 354 | 35.4 | 0.47 | 1.80 |
| 3 | 1 | 0.10 | 20 | 10 | 16 | 326 | 32.6 | 0.48 | 1.68 |
| 4 | 1 | 0.2 | 40 | 10 | 16 | 262 | 26.2 | 0.47 | 1.60 |
| 5 | 1 | 0.50 | 100 | 10 | 16 | 206 | 20.6 | 0.44 | 1.44 |
| 6 | 1 | 1.00 | 200 | 10 | 16 | 92 | 9.2 | 0.41 | 2.08 |
| 7 | 1 | 0.05 | 10 | 10 | 32 | 322 | 32.2 | 0.47 | 2.03 |
| Comparative Example | | CMDS (mmol) | | | | | | | |
| 1 | 1 | 0.05 | 10 | 10 | 16 | 334 | 33.4 | 0.46 | 1.84 |
| 2 | 1 | 0.10 | 20 | 10 | 16 | 278 | 27.8 | 0.48 | 1.84 |
| 3 | 1 | 0.20 | 40 | 10 | 16 | 154 | 15.4 | 0.47 | 1.56 |
| 4 | 1 | 0.50 | 100 | 10 | 16 | 142 | 14.2 | 0.46 | 1.60 |
| 5 | 1 | 0.05 | 10 | 10 | 32 | 304 | 30.4 | 0.48 | 1.96 |

TABLE 2

| Example | TEAl mmol | DBDS mmol | Si/Ti | Catalyst mg | H₂ mmol | Yield g | Efficiency Kg/g-cat·h | Bulk Density | Xylene Soluble wt % |
|---|---|---|---|---|---|---|---|---|---|
| 8 | 1 | 0.05 | 10 | 10 | 16 | 322 | 32.2 | 0.46 | 2.76 |
| 9 | 1 | 0.10 | 20 | 10 | 16 | 302 | 30.2 | 0.47 | 1.74 |
| 10 | 1 | 0.20 | 40 | 10 | 16 | 292 | 29.2 | 0.47 | 1.44 |
| 11 | 1 | 0.50 | 100 | 10 | 16 | 285 | 28.5 | 0.47 | 1.72 |
| 12 | 1 | 1.00 | 200 | 10 | 16 | 210 | 21.0 | 0.46 | 1.72 |
| 13 | 1 | 0.05 | 10 | 10 | 8 | 352 | 35.2 | 0.45 | 2.24 |
| 14 | 1 | 0.05 | 10 | 10 | 32 | 304 | 30.4 | 0.47 | 2.96 |
| | | BMDS (mmol) | | | | | | | |
| 15 | 1 | 0.05 | 10 | 10 | 16 | 333 | 33.3 | 0.45 | 2.8 |
| 16 | 1 | 0.10 | 20 | 10 | 16 | 314 | 31.4 | 0.44 | 2.4 |
| 17 | 1 | 0.20 | 40 | 10 | 16 | 289 | 28.9 | 0.44 | 2.2 |
| 18 | 1 | 0.50 | 100 | 10 | 16 | 202 | 20.2 | 0.44 | 2.0 |
| 19 | 1 | 1.00 | 200 | 10 | 16 | 99 | 9.9 | 0.40 | 2.2 |
| 20 | 1 | 0.05 | 10 | 10 | 8 | 272 | 27.2 | 0.43 | 2.8 |
| 21 | 1 | 0.05 | 10 | 10 | 32 | 280 | 28.0 | 0.45 | 2.9 |
| Comparative Example | | CMDS (mmol) | | | | | | | |
| 6 | 1 | 0.05 | 10 | 10 | 16 | 327 | 32.7 | 0.48 | 1.7 |
| 7 | 1 | 0.10 | 20 | 10 | 16 | 321 | 32.1 | 0.48 | 1.6 |
| 8 | 1 | 0.20 | 40 | 10 | 16 | 328 | 32.8 | 0.47 | 1.3 |
| 9 | 1 | 0.50 | 100 | 10 | 16 | 232 | 23.2 | 0.48 | 1.3 |
| 10 | 1 | 1.00 | 200 | 10 | 16 | 115 | 11.5 | 0.42 | 1.6 |
| 11 | 1 | 0.05 | 10 | 10 | 8 | 264 | 26.4 | 0.47 | 1.8 |
| 12 | 1 | 0.05 | 10 | 10 | 32 | 313 | 31.3 | 0.48 | 1.7 |

TABLE 3

| Example | TEAl mmol | DPDS mmol | Si/Ti | Catalyst mg | H₂ mmol | Yield g | Efficiency Kg/g-cat·h | Xylene Solubles wt % |
|---|---|---|---|---|---|---|---|---|
| 22 | 1 | 0.02 | 4 | 10 | 16 | 385 | 38.5 | 2.72 |
| 23 | 1 | 0.1 | 20 | 10 | 16 | 355 | 35.5 | 1.6 |
| Comparative Example | | | | | | | | |
| 13 | 1 | 0.02 | 4 | 10 | 16 | 348 | 34.8 | 5.68 |
| 14 | 1 | 0.1 | 20 | 10 | 16 | 296 | 29.6 | 2.68 |

As shown in Table 1, the efficiency is greater than 30 kg/g-cat·1 h for Si/Ti ratios within the range from about 4 to about 40 and it decreases as the Si/Ti ratio increases from about 40 to about 200, reaching a maximum at some point between about 4 to about 10 Si/Ti. The DPDS system is capable of easily achieving efficiencies greater than 30 kg/g-cat·1 h. Also, as seen from the results shown in Table 1, the xylene solubles were controlled within a narrow range as the Si/Ti ratio varies from 4–200. The relationship is nearly linear with a small, gradual slope. As discussed, these relationships of the properties of the polymer and the Si/Ti ratio are very advantageous in allowing some fluctuations in the operation of the reactor and/or some errors without significantly changing the properties of the product. It also allows particular specifications for a product to be achieved more easily with a broader range of reactor parameters.

As shown in Tables 1, 2, and 3, the efficiency is at least 30 kg/g-cat·1 h for Si/Ti ratios within the range from about 4 to about 20, reaching a maximum at some point between about 4 to about 10 Si/Ti. This electron donor system is capable of easily achieving efficiencies of at least 30 kg/g-cat·1 h. Also, as seen from the results shown in Tables 1, 2, and 3 the xylene solubles are less than 3.00 wt % as the Si/Ti ratio varies from 4–200. As shown in Table 3, the combination of DPDS with a particular catalyst component affords a higher polymer yield, lower xylene solubles, and better melt flow control (lower melt flow values).

Obviously, numerous modifications and variations of the present invention are possible in light of the above teachings. It is therefore to be understood that within the scope of the appended claims, the invention may be practiced otherwise than as specifically described herein.

What is claimed as New and Desired to be Secured by Letter of Patent of the United States of America is:

1. A catalyst for the polymerization or copolymerization of olefins comprising:
   (a) a solid catalyst component prepared by:
      (i) suspending a dialkoxymagnesium in an aromatic hydrocarbon
      (ii) contacting the dialkoxymagnesium with a titanium halide and further contacting the resulting composition a second time with the titanium halide, and (iii) contacting the dialkoxymagnesium with a diester of an aromatic dicarboxylic acid at some point during the treatment with the titanium halide in (ii); and (b) an electron donor described by the formula:

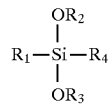

wherein $R_1$ is an alkyl group of the formula —$CH_2R'$ in which R' is hydrogen or an n-alkyl group; $R_2$ and $R_3$ are each independently an alkyl or aryl group; and $R_4$ is an alkyl group of the formula —$CH_2R'$ in which R' is hydrogen or an n-alkyl group, $R_1$ and $R_4$ are the same or different.

2. The catalyst of claim 1 wherein $R_1$ and are alkyls of up to 5 carbon atoms.

3. The catalyst of claim 1 wherein $R_1$ and $R_4$ are selected from the group consisting of n-propyl, n-butyl and methyl groups.

4. The catalyst of claim 1 wherein $R_1$ and $R_4$ are the same and are selected from the group consisting of n-propyl and n-butyl.

5. The catalyst of claim 1 wherein $R_1$ is methyl and $R_4$ is $C_3$ or higher.

6. The catalyst of claim 1 wherein $R_2$ and $R_3$ are selected from the group consisting of methyl, ethyl, propyl, and butyl groups.

7. The catalyst of claim 1 wherein the electron donor is selected from the group consisting of di-n-propyldimethoxysilane, di-n-butyldimethoxysilane and n-butylmethyldimethoxysilane.

8. The catalyst of claim 1 further comprising: (c) an organoaluminum compound.

9. The catalyst of claim 8 wherein the organoaluminum compound is selected from the group consisting of a trialkylaluminum, an alkylaluminum dihalide, and a dialkylaluminum halide.

10. The catalyst of claim 9 wherein the organoaluminum compound is triethylaluminum.

11. The catalyst of claim 1 characterized by a catalyst efficiency of over 30 kilograms of polymer product per gram of catalyst in one hour when the mole ratio Si/Ti as derived from the Si in compound (b) to the Ti from compound (a) is within the range of 4–200.

* * * * *